United States Patent
Tehranchi (10) Patent No.: US 9,708,845 B2
(45) Date of Patent: Jul. 18, 2017

(54) MOVABLE BARRIER OPERATOR EMPLOYING MEMS-BASED INERTIAL MEASURING UNIT FOR GATHERING BARRIER PARAMETER DATA

(71) Applicant: Viking Access Systems, LLC, Irvine, CA (US)

(72) Inventor: Ali Tehranchi, Irvine, CA (US)

(73) Assignee: VIKING ACCESS SYSTEM, LLC., Irvine, CA (US)

(*) Notice: Subject to any disclaimer, the term of this patent is extended or adjusted under 35 U.S.C. 154(b) by 405 days.

(21) Appl. No.: 14/198,344

(22) Filed: Mar. 5, 2014

(65) Prior Publication Data
US 2015/0253784 A1    Sep. 10, 2015

(51) Int. Cl.

| | | |
|---|---|---|
| *G05B 5/00* | (2006.01) | |
| *H02H 7/08* | (2006.01) | |
| *H02P 1/00* | (2006.01) | |
| *H02P 3/00* | (2006.01) | |
| *H02P 7/00* | (2016.01) | |
| *E05F 15/70* | (2015.01) | |
| *E05F 15/73* | (2015.01) | |
| *E05F 15/603* | (2015.01) | |
| *E05F 15/20* | (2006.01) | |
| *E05F 15/00* | (2015.01) | |
| *G04C 23/00* | (2006.01) | |
| *G05D 23/275* | (2006.01) | |

(52) U.S. Cl.
CPC .............. *E05F 15/70* (2015.01); *E05F 15/73* (2015.01); *E05F 15/0008* (2013.01); *E05F 15/2092* (2013.01); *E05F 15/603* (2015.01); *G04C 23/00* (2013.01); *G05D 23/2754* (2013.01)

(58) Field of Classification Search
CPC . G04C 23/00; G05D 23/2754; E05F 15/0008; E05F 15/2092; E05Y 2400/66
USPC .......................................................... 318/452
See application file for complete search history.

(56) References Cited

U.S. PATENT DOCUMENTS

| | | | | |
|---|---|---|---|---|
| 2005/0253710 | A1* | 11/2005 | Eskildsen | G08B 13/08 340/545.5 |
| 2009/0149999 | A1* | 6/2009 | Schramm | F16H 57/0006 700/280 |
| 2009/0211160 | A1* | 8/2009 | Tehranchi | E05F 15/603 49/360 |
| 2010/0071264 | A1* | 3/2010 | Faulkner | E05F 15/63 49/26 |

(Continued)

*Primary Examiner* — Kawing Chan
*Assistant Examiner* — Bradley Brown
(74) *Attorney, Agent, or Firm* — Jafari Law Group, Inc.

(57) ABSTRACT

The invention relates to a movable barrier operator with a microelectromechanical positioning sensor, or a movable barrier operator that employs an inertial measuring unit to receive a signal associated with a barrier position, and communicate that signal to one or more devices. A device in communication with the movable barrier operator may be enabled for receiving information pertaining to the barrier and for providing commands that actuate the barrier at precise barrier parameters. In an exemplary embodiment, a movable barrier such as a swing-arm gate may be accurately controlled without requiring manual positioning mechanisms, or otherwise require physical components to set the gate's open and closed limits. Additionally, accurate information may be communicated to a user device, for monitoring and providing maintenance to the movable barrier system.

5 Claims, 4 Drawing Sheets

(56) References Cited

U.S. PATENT DOCUMENTS

2010/0115853 A1* 5/2010 Gebhart ............... H02P 6/085
                                                              49/506

* cited by examiner

MOVABLE BARRIER OPERATOR EMPLOYING MEMS-BASED INERTIAL MEASURING UNIT FOR GATHERING BARRIER PARAMETER DATA

TECHNICAL FIELD OF THE INVENTION

The present invention relates generally to a movable barrier operator with a microelectromechanical sensor, and more particularly, to a movable barrier operator that employs microelectromechanical system (MEMS) or a MEMS-based inertial measuring unit (IMU) for gathering useful information pertaining to precise barrier parameters.

BACKGROUND OF THE INVENTION

Today, movable barrier operators comprise a wide variety of components that enable the control of different types of movable barriers. Some of these components include sensors, gearboxes, limit switches, positive stops, and other mechanisms that facilitate the control of a movable barrier. Movable barriers are typically doors, swing arms, or gates that control access to a structure or location. Many of these barriers require control of the range of motion or positioning. In the past, these position parameters have been controlled by manual or physical means, which include limit switches or position stops that restrain the operator's motor from actuating the barrier past a particular limit so that the barrier functions within a desired open and close range.

These physical components work by either preventing the barrier from physically moving past a desired limit, or by switching the motor off when a particular limit has been reached so that the operator no longer actuates the barrier's motion. In either case, these means of controlling a movable barrier impose additional components on the movable barrier operator. These components, such as limit switches and positive stops, must be installed and typically housed within the operator housing or otherwise attached to the movable barrier. This adds complications to operator installing procedures, repair procedures, and maintenance procedures, in addition to increasing overall costs.

For example, while installing the operator, a technician is required to set the barrier limits by manually positioning the switches or positive stops at the desired parameter. Typically, this procedure demands that the technician try opening and closing the movable barrier numerous times to make sure the desired range of motion or range of operation for the barrier is achieved. If the operator requires repairs pertaining to the barrier's travel limits, a technician will need to manually adjust these components or perhaps replace them altogether. Similarly, when a technician is providing maintenance to the operator, the technician is required to manually access each component to determine whether each component is functioning properly. And in every instance, the technician will have to open the operator housing and interrupt barrier operation in order to complete the task.

Therefore, there is a need in the art for a movable barrier operator that utilizes a means to set, detect, and adjust a desired barrier positioning parameter, without the need for components that require complex manual installation procedures, or require time-consuming maintenance. It is to these ends that the present invention has been developed.

SUMMARY OF THE INVENTION

To minimize the limitations in the prior art, and to minimize other limitations that will be apparent upon reading and understanding the present specification, the present invention describes a movable barrier operator with a microelectromechanical positioning sensor, or a movable barrier operator that employs microelectromechanical systems (MEMS). A movable barrier operator system in accordance with the present invention, utilizes MEMS for receiving a positioning signal associated with a barrier position, and communicates that signal to one or more devices. Thus, a device in communication with the movable barrier operator may be enabled for receiving information pertaining to the barrier and for providing commands that actuate the barrier at precise barrier parameters.

A movable barrier operator, in accordance with one embodiment of the present invention, comprises: a motor; a gearbox rotatably coupled to the motor, wherein the gearbox is configured to move a barrier in response to activation of the motor; an arm mechanically coupled to the gearbox and the barrier, in a manner so that moving the arm causes the barrier to move between an open position and a close position; and an inertial measuring unit coupled to the arm, for generating an output pertaining to one or more parameters of the barrier.

A movable barrier system, in accordance with one embodiment of the present invention, comprises a movable barrier; a motor mechanically coupled to the movable barrier; a connector, mechanically connecting the motor to the movable barrier so that movement of the motor rotates the connector and a rotation of the connector causes the movable barrier to move between an open position and a close position; an inertial measuring unit coupled to the connector, for generating an output pertaining to one or more parameters of the barrier, wherein the inertial measuring unit is positioned on the connector so that movement of a position of the inertial measuring unit coincides with the position of the barrier; and a user interface comprising a display, for providing the output generated by the inertial measuring unit, wherein the output pertains to the position of the barrier.

A movable barrier operator, in accordance with another embodiment of the present invention, comprises: a motor configured to move a barrier; a gearbox rotatably coupled to the motor, wherein the gearbox is configured to move a barrier in response to activation of the motor; an arm mechanically coupled to the gearbox and the barrier, in a manner so that moving the arm causes the barrier to move between an open position and a closed position; one or more inertial measuring units for generating one or more signals related to one or more parameters of the movable barrier operator; and a controller, configured to receive the one or more signals from the one or more inertial measuring units, and generate a command to activate or deactivate the motor, based on the one or more signals from the one or more inertial measuring units, in order to start or stop movement of the barrier.

It is an objective of the present invention to provide a movable barrier operator that allows a user to set, detect, and adjust a desired barrier positioning parameter, without the need for components that require complex manual installation procedures, or require time-consuming maintenance.

It is another objective of the present invention to provide a movable barrier operator that utilizes MEMS-based IMU to circumvent traditional components for reading and adjusting travel limits, or positioning of movable barriers.

It is yet another objective of the present invention to provide a movable barrier operator that enables quick access to barrier positioning parameters.

It is yet another objective of the present invention to facilitate detection of barrier travel limit parameters during maintenance and repairs, without having to access the other components attached to the operator.

It is yet another objective of the present invention to provide a movable barrier operator that communicates a barrier's parameters to a user without the need for the user to manually access additional components.

It is yet another objective of the present invention to minimize or eliminate the need for technicians to manually set barrier travel limits with physical components such as limit switches and position stops.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

In the following detailed description, a movable barrier operator may be any system that controls a barrier to an entry, an exit, or a view. The barrier could be a door for a small entity (i.e. a person), or a gate for a large entity (i.e. a vehicle), which may swing out, slide open, or roll upwards. The operator, which moves the barrier from an open position to a closed position and vice-versa, may be manual or automatic and may be controlled locally or remotely. Furthermore, MEMS or MEMS-based may refer to any type of microelectromechanical systems that implement sensors, such as an inertial measurement unit (IMU), that measures and reports on a device's velocity, orientation, acceleration, and other parameters. A MEMS-based IMU may include one or more components such as accelerometers and gyroscopes, which themselves comprise of one or more sensors within the IMU. In the scope of the present invention, a MEMS-based IMU may be utilized for determining movable barrier parameters such as speed, travel limits, and position.

Generally, the invention relates to a movable barrier operator that may be retrofitted with a MEMS-based IMU for achieving a cost-effective and easily maintainable operator that provides accurate positioning and control of movable barriers. Although the present invention may be utilized with many types of movable barriers, it is especially useful with swing-arm gates. These gates are commonly used for limiting access to vehicles, as they comprise an arm that swings up or down to allow or prevent a flow of traffic into or out of a desired area, for example a parking structure. Previously, these types of movable barriers had to be retrofitted with numerous components, including limit switches and positive stops. The use of a MEMS-based IMU circumvents having to implement these components into the operator, which makes their manufacture more efficient and cost-effective, and also improves the quality and precise measurement of the barrier parameters.

In an exemplary embodiment, a MEMS-based IMU may be placed on a joint of a barrier in a manner so that movement of the arm changes an angle position of the IMU. The IMU is then able to generate signals indicating the angle position of the barrier. These signals may be sent to a controller for generating a command that, for example, disengages a motor so that movement of a barrier is stopped. Additionally, an output of the parameters, for example a position of the barrier, may be provided to a user via a user interface; alternatively, these signals may be sent directly to a user interface and the processor need not be configured for receiving any of the IMU output. This may be useful, for example, if only information is desired and actuation of the barrier is not dictated by the IMU output. Either way, a user may access the user interface and be able to tell the exact position of the barrier, without having to resort to accessing additional components.

Another exemplary embodiment may include using a MEMS-based IMU output for indication of the inclination angle of a barrier, in conjunction with executable code that programs the movable barrier to slow down, or speed up until reaching a desired limit. For example, a movable barrier may slow down prior to the barrier arm reaching a fully open or fully closed position. In such an embodiment, a user may be enabled with a user interface to control the angle or position at which the barrier arm starts to slow down prior to finalizing the opening or closing cycle.

These configurations are desirable as maintenance, and servicing of such an operator is simplified. These configurations are particularly desirable to deal with events of power failures. For example, when power goes out, presently existing barrier operators may require recalibration or even manual readjustment; an operator may implement optical or magnetic encoders, which upon power failures require re-calibration since operators that use encoders necessitate a point of reference in order to provide accurate barrier parameters. On the other hand, practice of the present invention, for example the implementation of a MEMS-based IMU into the arm of the operator, circumvents having to manually readjust or recalibrate the operator and barrier when power is restored.

Figure 1A:
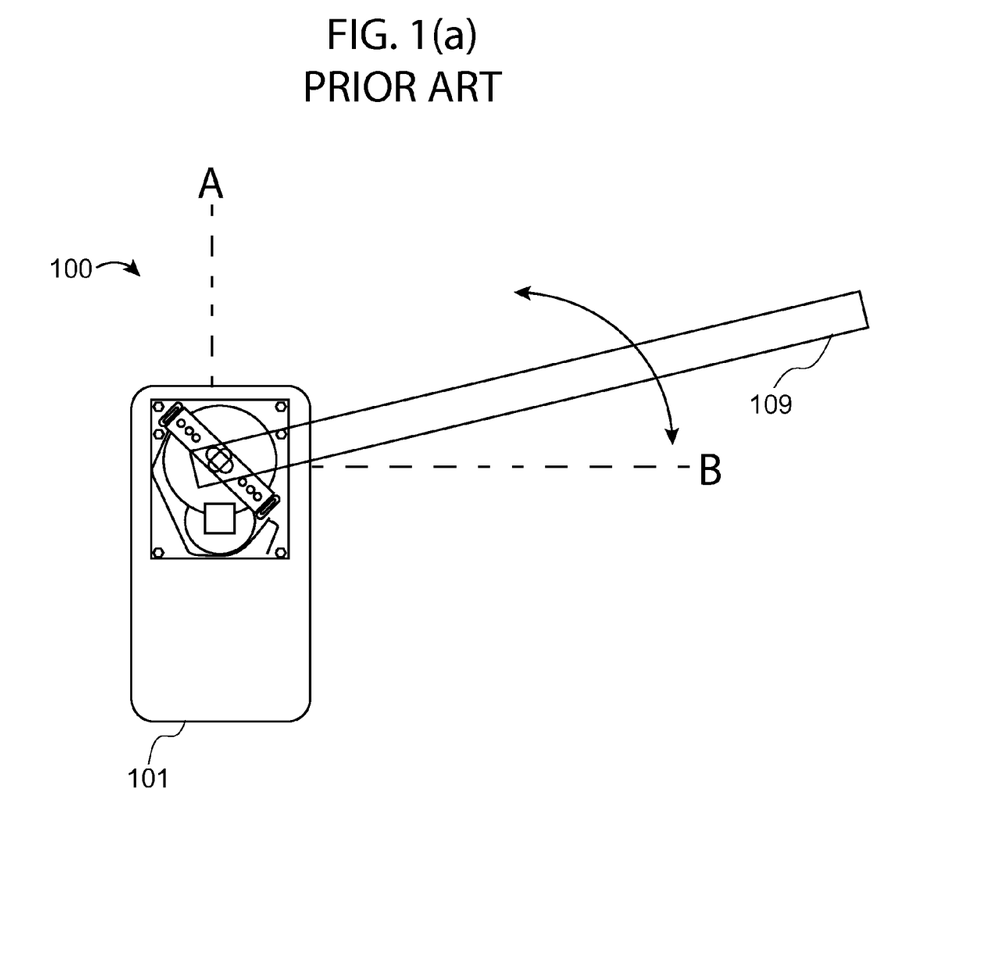
FIG. 1(a) illustrates a typical arm-gate operator found in the prior art, that utilizes components to control the travel limit of the arm, including positive stops and limit switches that must be housed in operator housing.
Figure 1B:
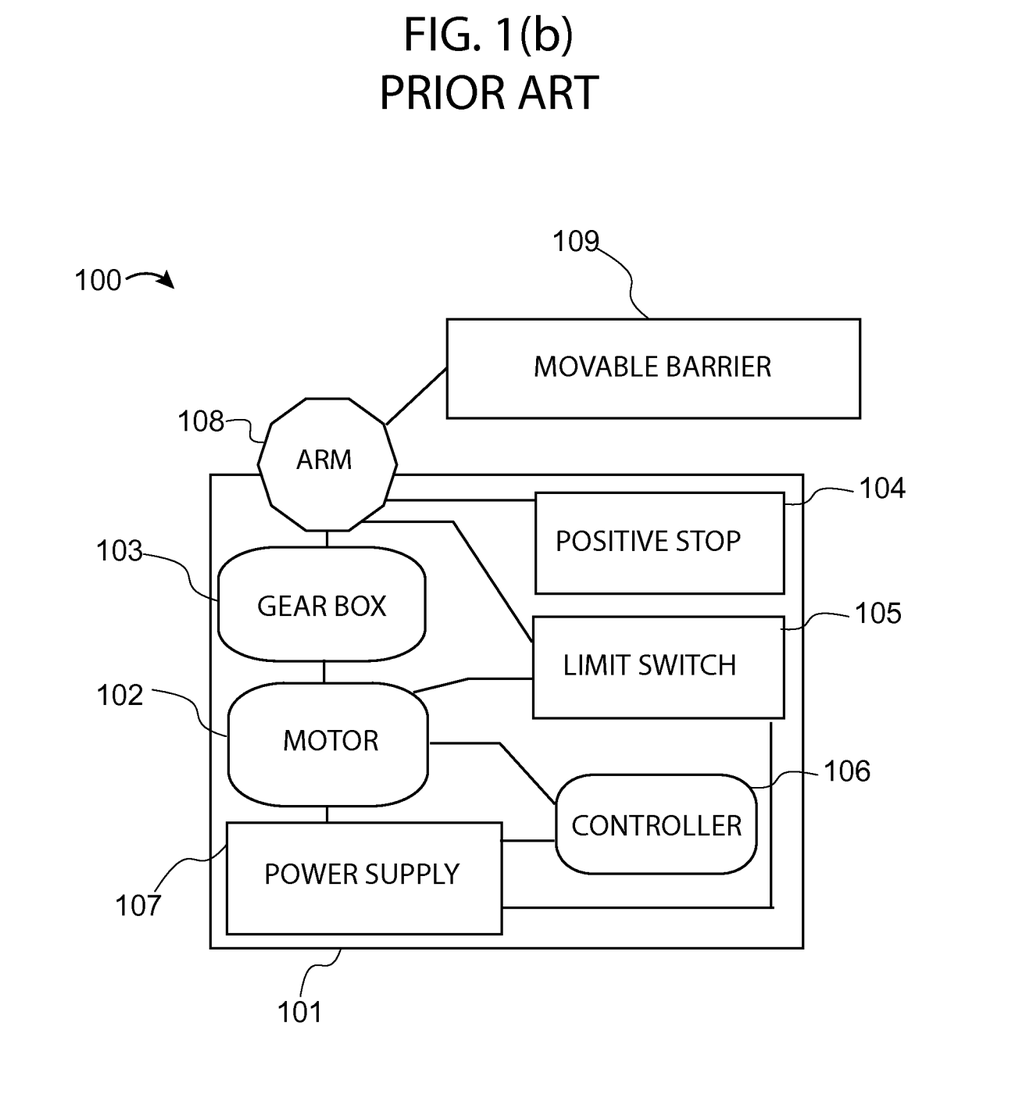
FIG. 1(b) illustrates a block diagram of the prior art operator depicted in FIG. 1(a), wherein positive stops and limit switches are utilized to determine and control the arm's position and travel limit.

Turning now to the figures, FIG. 1(a) illustrates a typical arm-gate operator, found in the prior art, which utilizes components to control the travel limit of the arm, including positive stops and limit switches that must be housed in the operator housing. FIG. 1(b) illustrates a block diagram of the prior art system depicted in FIG. 1(a). More specifically, FIG. 1(a) and FIG. 1(b) depict movable barrier operator 100, which compromises of housing 101, wherein motor 102, gearbox 103, positive stops 104, limit switches 105, controller 106, and power supply 107 are all housed together to control movement of movable barrier 109.

Barrier 109 swings up and down between positions A and B to allow or deny access to vehicles. Barrier 109 is controlled by the actuation of motor 102, which is mechanically coupled to gearbox 103. As gearbox 103 is activated by motor 102, connector 108, which connects the operator to the movable barrier, rotates. Being coupled to barrier 109, as connector 108 rotates, barrier 109 is moved up and down between A and B. While seemingly simplistic, these types of operators typically require additional components that make them costly and difficult to maintain or repair. That is, in order for movement of barrier 109 to be properly controlled and monitored, positive stop 104 and limit switches 105 must be utilized.

Positive stop 104 is typically designed for gate operators that require a positive gate stop, such as the prior art operator shown. Positive stop 104 usually comprises of subcomponents such as rubber grommets to cushion the gate and help eliminate slamming when the barrier hits the stop. Typically, the operator senses when the barrier meets the stop and shuts down motor 102. One problem with positive stops is that the operator is burdened by the stress of physically hitting a stop every time the barrier is actuated. This requires that every so often positive stops be maintained and either recalibrated or replaced, as the components may wear down. Additionally, other components of the operator may wear down as a result of heavy use, particularly components that are used to structurally support positive stop 104. Thus, circumventing the need for components such as positive stop 104 adds life to an operator, and makes installation and maintenance more efficient and cost-effective.

Along with positive stops, limit switches 105 are often used as well. These are the switches that turn off the motor when a particular travel limit is reached. Limit switch 105 is typically coupled to operator 100 in a manner so that limit switch 105 is activated depending on the movement of barrier 109; activation turns the motor off so that the barrier movement stops. This means that additional components must be implemented into operator 100 in order to configure limit switches 105 accordingly. Such additional components comprise of wiring or circuitry along with other structural components with which the operator has to be retrofitted to support limit switches 105.

Furthermore, although implementing positive stops and limit switches allows a user to configure an operator's travel limits and desired positioning, the desired travel limits or position of barrier 109 have to be adjusted manually, as the user cannot be informed of the parameters of barrier 109 without, for example, performing measurements. Additionally, implementation of positive stop 104 and limit switches 105 requires the use of support structures for providing proper alignment and actuation of each component.

Therefore, the present invention teaches a manner in which to implement MEMS or a MEMS-based IMU in order to circumvent the use of positive stops and limit switches, along with their required subcomponents, including support structures and wiring that make the use of such components cumbersome and needlessly expensive. Additionally, utilizing MEMS or a MEMS-based IMU provides users such as installers or maintenance workers with useful information about the system's parameters—information like barrier position, speed, and travel limits, which are not otherwise communicated utilizing the prior art components.

Figure 2:
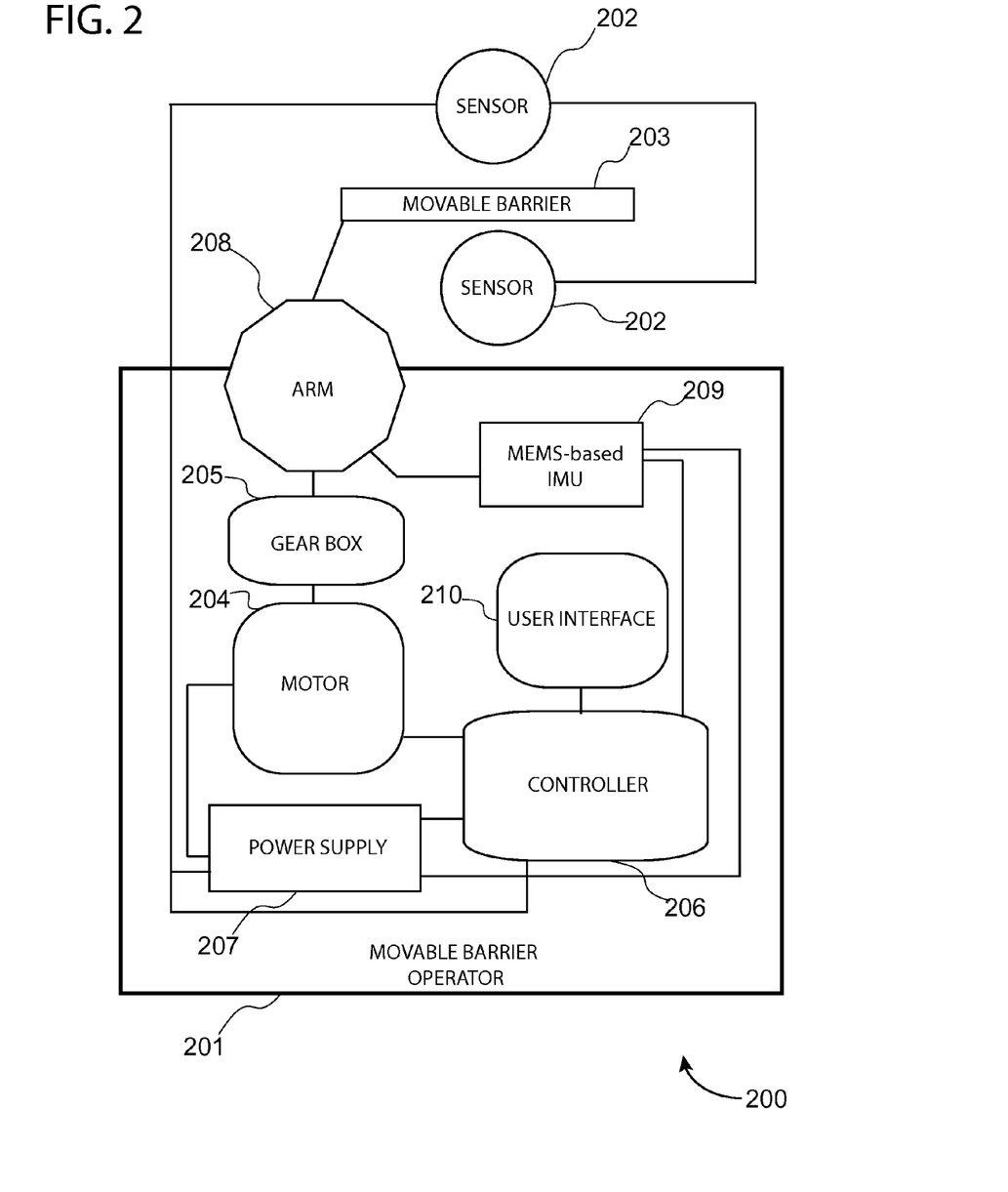
FIG. 2 illustrates a movable barrier system in accordance with one embodiment of the present invention, wherein the operator is retrofitted with a MEMS-based IMU, thereby circumventing the need to use positive stops and limit switches for determining and controlling the arm's travel limit.

Now turning to the next figure, FIG. 2 illustrates a movable barrier system in accordance with one embodiment of the present invention, wherein the operator is retrofitted with a MEMS-based IMU, thereby circumventing the need to use positive stops and limit switches for determining and controlling the arm's travel limit or angle of position. More specifically, FIG. 2 depicts movable barrier system 200, which comprises of operator 201, sensors 202, and barrier 203.

Housed within operator 201 is motor 204, gearbox 205, controller 206, and power supply 207. Also housed with the other components (at least partially) is a connector or arm 208 for mechanically connecting gearbox 205 with barrier 203. Situated at arm 208 is a MEMS-based inertial measuring unit or IMU 209, which provides information pertaining to one or more parameters associated with barrier 203.

Operator 201 may function as follows: motor 204 and gearbox 205 help to actuate and drive barrier 203. Motor 204 may be any type of motor suitable for movable barrier operators. Hence, without deviating from the scope of the present invention, motor 204 may be a Lorentz force motor, a hub motor, or any other type of motor known in the art and suitable for actuating barrier 203. Similarly, gearbox 205 may be any type of suitable gearbox for facilitating movement of barrier 203, and is preferably a compact gearbox that allows for an efficient use of space within the operator's housing. Power supply 207 provides power to operator 201, and in some embodiments, provides power to all the components of system 200. Power supply 207 may be any known power source suitable as a source of power, for example, capable of supplying and charging a battery and the other components of operator 201. Sensors 202 may indicate when to actuate the movable barrier when, for example, a vehicle is approaching or an object is presenting an obstruction. Sensors 202 may comprise of any type of sensors, including inductive loop sensors, capacitance sensors, a magnetic sensor, an ultrasonic sensor, a retro reflective sensor, an optical sensor, a photo beam sensor, an infrared sensor, or any other type of sensors known in the art without departing from the scope of the present invention. Controller 206 may be any type of controller that is suitable for actuating motor 204 upon automated commands or a user command, or upon receiving signals from sensors 202. Furthermore, controller 206 may be configured for communicating with user interface 210 to provide a user with data pertaining to one or more parameters of system 200. Controller 206 may be installed so that it is in communication with IMU 209. Although in some embodiments it may be desirable for IMU 209 to include a user interface on its own, in other embodiments, IMU 209 and controller 206 may share a common user interface. For example, user interface 210 may be enabled to communicate with both controller 206 and IMU 209 so that a user receives information pertaining to system 200 in a single interface. Such a configuration may be desirable for performing system diagnostics, which take into account the various information provided via controller 206 and IMU 209.

In an exemplary embodiment, IMU 209 may be placed on a barrier arm in a manner so that movement of the arm changes an angle position of IMU 209. For example, and without limiting the scope of the present invention, IMU 209 may be placed on arm 208 in a manner so that rotating IMU 209 coincides with a rotation and position of barrier 203. IMU 209 may be enabled to generate signals indicating the angle position of barrier 203. These signals may be sent to controller 206 for generating a command that, for example, disengages motor 204 so that movement of barrier 203 is stopped at a desired parameter (e.g. at a desired angle). Additionally, an output of the parameters, for example a position of barrier 203, may be provided to a user via user interface 210. Alternatively, the signal or data output from IMU 209 may be sent directly to a user interface and the processor need not be configured for receiving any of the IMU output. This may be useful, for example, if only information is desired and actuation of the barrier is not dictated by the IMU-generated data. Either way, a user may access the user interface and be able to tell the exact position of the barrier arm, without having to resort to accessing additional components or making any measurements.

IMU 209 may comprise of any type of MEMS-based IMU suitable for gathering information pertaining to an angle position, a travel limit, a speed, a velocity, or an acceleration associated with barrier 203. This information may be useful for monitoring, installing, calibrating, or troubleshooting operator 201. Without limiting the scope of the present invention, IMU 209 may comprise an accelerometer, a gyroscope, or both an accelerometer and a gyroscope. Typically, IMU 209 comprises several internal sensors that are housed in a special housing that ruggedizes IMU 209 so that IMU 209 is strengthened for better resistance to wear, stress, and abuse endured by movable barrier operators in the field.

IMU 209 may provide single axis information, or multiple axis information, and may provide an output in analog, digital, TTL, I2C, or in any other output suitable for presenting the parameter information via user interface 210. In an exemplary embodiment, IMU 209 provides an output using the I2C protocol. This protocol is well known, allowing communication of data between I2C devices over two wires. It sends information serially using one line for data (SDA) and one for clock (SCL). Any output provided by IMU 209 may be provided to controller 206 and sent to user interface 210, where the output may be presented via other means such as a graphical display.

In an exemplary embodiment, an output provided by IMU 209 may be provided to controller 206 for generating a command to stop movement of motor 204. The output information may, for example, include data pertaining to an angle position at which barrier 203 is stopped. Such parameter information may be routed to user interface 210 so that a user, for example an installer, may perform any troubleshooting of operator 201.

In another embodiment, an output provided by IMU 209 may be provided directly to a user interface. The output information may, for example, include data pertaining to an angle position at which barrier 203 is stopped, but this data is not directly utilized to command actuation of motor 204. Rather, the parameter information may be provided via user interface 210 so that a user, for example an installer, may perform any troubleshooting of operator 201, and then separately program controller 206 to perform within the desired parameters. In this embodiment, IMU 209 primarily serves as a diagnostic tool rather than a means to control the operator's parameters.

User interface 210 may be an interface for providing users with information supplied to operator 201 via external components such as sensors 202 and internal components such as IMU 209. User interface 210 may be a simple I/O device for connecting other devices in order to glean the required information, or may be as complex as an LCD screen for presenting a graphical user interface in which the information supplied by IMU 209 and controller 206 is displayed to a user.

Typically, as controller 206 sends a signal commanding motor 204 to engage, gearbox 205 is actuated and movement of barrier 203 is achieved. In the exemplary embodiment shown, movable barrier operator 201 comprises of arm 208, which is mechanically coupled to barrier 203. As motor 204 is actuated and gearbox 205 turns, actuator arm rotates and moves barrier 203 from an upward position to a lower position in the similar manner as with prior art operators such as the one disclosed with reference to FIG. 1(a). However, retrofitting operator 201 with IMU 209 allows a user to learn of accurate information pertaining to the movement and position of barrier 208, which is otherwise unavailable to a user of operator 101. Furthermore, operator 201 does away with components and subcomponents such as positive stop 104 and limit switches 105, along with their supporting structures. This makes operator 201 lighter, less costly, and capable of supplying parameter information unavailable with operator 101. For example, operator 101 does not provide information pertaining to the exact angle at which barrier 102 is situated; operator 201 on the other hand, is retrofitted with IMU 209, hence accurate angle information pertaining to barrier 203 may be provided in real time and with high precision and accuracy.

Because arm 208 couples gearbox 205 to barrier 203, this makes this location suitable for installation of a MEMS-based IMU such as IMU 209. As arm 208 rotates, a complementary motion moves barrier 203 from a raised position to a lowered position. IMU 209 is hence able to detect and supply information to a user pertaining to the position—including angle, speed, velocity, or acceleration—of barrier 203.

A user may utilize this information for providing maintenance or performing diagnostic tests on operator 201. Additionally, in one embodiment, rather than manually setting travel limits with positive stops or limit switches, a user such as an installer, may simply access user interface 211 and input the desired angles at which barrier 208 is preferably operated. For example, if a desired open position is ninety degrees and a desired closed position is at one hundred and eighty degrees, then inputting this information via user interface 211 is much simpler than adjusting or calibrating components such as positive stops and limit switches, since the present invention would not require manual calibration of these components.

Figure 3:
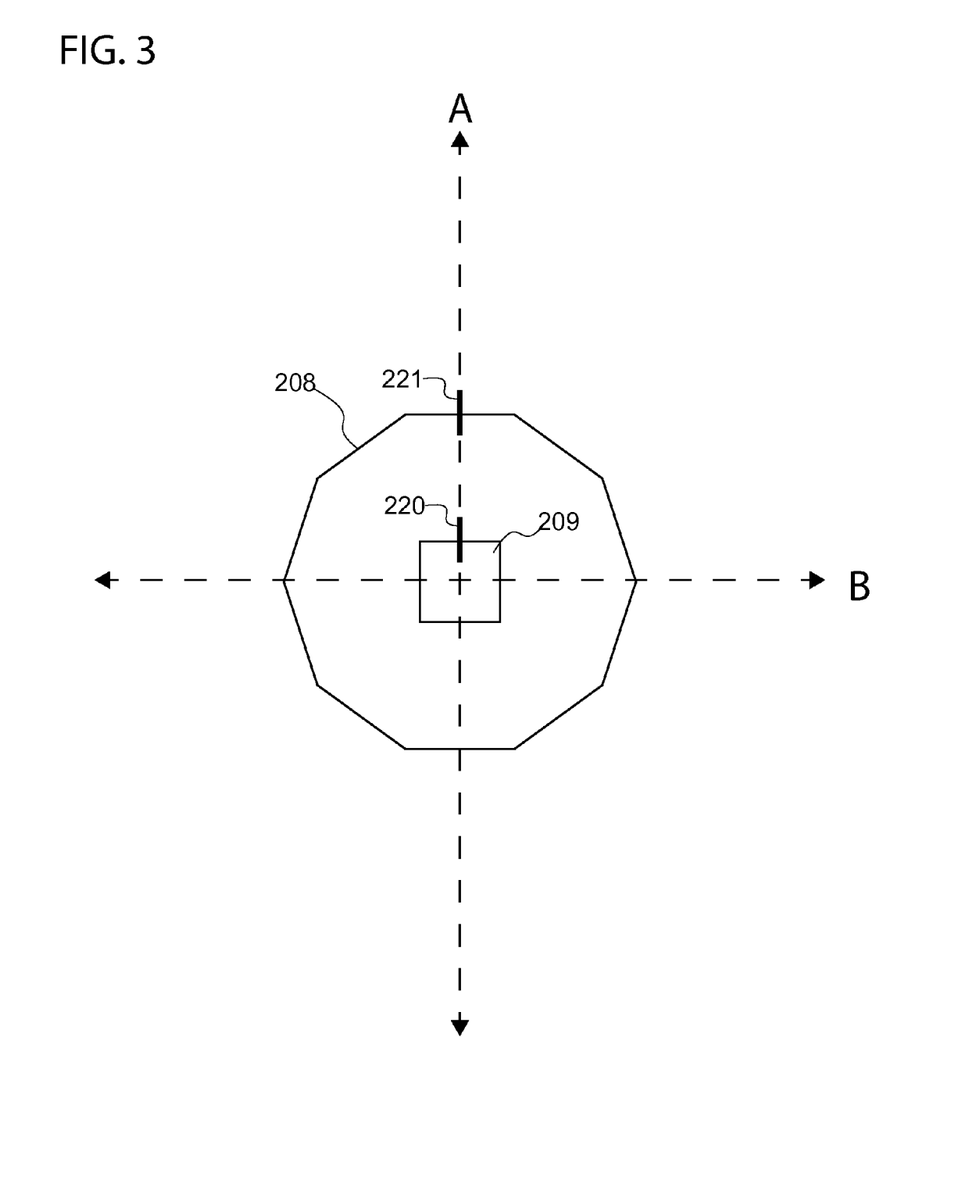
FIG. 3 is a diagram that illustrates the positioning of a MEMS-based IMU in accordance with one embodiment of the present invention.

Turning now to FIG. 3, a diagram is illustrated to show the coupling of IMU 209 to arm 208, in accordance with one embodiment of the present invention, in order to adapt IMU 209 for providing an output pertaining to an angle position associated with barrier 203. In the shown embodiment, IMU 209 is positioned and calibrated in a manner so that a north-facing portion of IMU 209, for example segment 220, coincides with a north-facing portion of arm 208, for example segment 221. In this way, as arm 208 rotates, for example towards a one hundred and eighty degree position from a ninety degree position or from point A to point B, IMU 209 will register the movement and output data pertaining to the angle at which arm 208 is currently positioned. Because the position of both arm 208 and IMU 209 coincide with the position of barrier 203, IMU 209 is essentially registering the angle position of barrier 203 when it registers its own position.

By supplying an output equivalent to the angle position at which arm 208 is presently situated, a user may be provided with information pertaining to the position of barrier 203. This output may be supplied in any number of ways, without limiting or deviating from the scope of the present invention, such as in analog or digital outputs. In an exemplary embodiment, the output is supplied as an I2C output, and is then translated via user interface 210, whereby a user will be able to read the desired parameters of barrier 203.

In other embodiments, IMU 209 may be configured to provide additional information including barrier speed and acceleration. This information may be useful as diagnostic or monitoring information for performing maintenance on the system, or providing a means of checking the system for errors.

Other embodiments and applications for retrofitting a movable barrier operator and movable barrier systems with MEMS may be possible. For example, MEMS may be utilized to allow a user to set, detect, and adjust a desired barrier-positioning parameter, without the need for components that require complex manual installation procedures, or require time-consuming maintenance. MEMS may be used to circumvent traditional components for reading and adjusting travel limits, or positioning of movable barriers. Even if only to glean pertinent and useful information about movable barrier systems, MEMS may enable quick access to barrier positioning parameters. The various embodiments of the present invention facilitate detection of barrier travel limits during maintenance and repairs, without having to access the other components attached to the operator. Furthermore, the present invention minimizes or eliminates the need for technicians to manually set barrier travel limits with physical components such as limit switches and position stops.

A movable barrier operator that employs microelectromechanical sensors (MEMS) or a MEMS-based inertial measuring unit (IMS) for gathering useful information pertaining to precise barrier parameters has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A movable barrier operator, comprising:
   a motor;
   a gearbox rotatably coupled to the motor, wherein the gearbox is configured to move a barrier in response to activation of the motor;
   an arm mechanically coupled to the gearbox and the barrier, in a manner so that moving the arm causes the barrier to move between an open position and a close position; and
   a MEMS-based inertial measuring unit including an accelerometer coupled to the arm for generating an output pertaining to one or more parameters of the barrier, the one or more parameters including:
      an angle at which the barrier is presently positioned,
      an acceleration at which the barrier is traveling,
      a speed at which the barrier is moving, and
      a position of the barrier in relation to a barrier travel limit;
   wherein the MEMS-based inertial measuring unit is coupled to the arm in a manner so that an orientation of the MEMS-based inertial measuring unit coincides with an orientation of the arm.

2. The movable barrier operator of claim 1, further comprising:
   a user interface for receiving and providing the output generated by the inertial measuring unit.

3. The movable barrier operator of claim 2, wherein the user interface further comprises an input device to alter the one or more parameters.

4. A movable barrier system, comprising:
   a movable barrier;
   a motor mechanically coupled to the movable barrier;
   a connector, mechanically connecting the motor to the movable barrier so that movement of the motor rotates the connector, and a rotation of the connector causes the movable barrier to move between an open position and a closed position;
   a MEMS-based inertial measuring unit including an accelerometer coupled to the connector, for generating an output pertaining to one or more parameters of the barrier, wherein the MEMS-based inertial measuring unit is positioned on the connector so that movement of a position of the MEMS-based inertial measuring unit coincides with the position of the barrier; and
   a user interface, for providing the output generated by the MEMS-based inertial measuring unit, wherein the output pertaining to the one or more parameters includes:
      an angle at which the barrier is presently positioned,
      an acceleration at which the barrier is traveling,
      a speed at which the barrier is moving, and
      a position of the barrier in relation to a barrier travel limit;
   wherein the MEMS-based inertial measuring unit is coupled to the connector in a manner so that an orientation of the MEMS-based inertial measuring unit coincides with an orientation of the connector.

5. A movable barrier operator, comprising:
   a motor configured to move a barrier;
   a gearbox rotatably coupled to the motor, wherein the gearbox is configured to move a barrier in response to activation of the motor;
   an arm mechanically coupled to the gearbox and the barrier, in a manner so that moving the arm causes the barrier to move between an open position and a closed position;
   one or more MEMS-based inertial measuring units including an accelerometer for generating one or more signals related to one or more parameters of the movable barrier operator;
   a user interface for providing data pertaining to the one or more signals from the one or more MEMS-based inertial measuring units; and
   a controller in communication with the motor, the one or more MEMS-based inertial measuring units, and the user interface, the controller configured to:
      receive the one or more signals from the one or more MEMS-based inertial measuring units,
      generate a command to activate or deactivate the motor, based on the one or more signals from the one or more MEMS-based inertial measuring units, in order to start or stop movement of the barrier, and
      receive, via the user interface, one or more values pertaining to the one or more parameters, and alter the one or more parameters based on the one or more values received, the one or more parameters including an angle at which the barrier is presently positioned, an acceleration at which the barrier is traveling, a speed at which the barrier is moving, and a position of the barrier in relation to a barrier travel limit;
   wherein the MEMS-based inertial measuring unit is coupled to the arm in a manner so that an orientation of the MEMS-based inertial measuring unit coincides with an orientation of the arm.

\* \* \* \* \*